Nov. 1, 1966

W. H. LIBAW 3,283,169

REDUNDANCY CIRCUIT

Filed July 11, 1960

2 Sheets-Sheet 1

INVENTOR:
William H. Libaw
By Smyth, Roston & Pavitt
Attorneys

INVENTOR:
William H. Libaw
By Smyth, Roston & Pavitt
Attorneys.

United States Patent Office 3,283,169
Patented Nov. 1, 1966

3,283,169
REDUNDANCY CIRCUIT

William H. Libaw, Los Angeles, Calif., assignor to The Magnavox Company, Los Angeles, Calif., a corporation of Delaware Filed July 11, 1960, Ser. No. 41,848
7 Claims. (Cl. 307—88.5)

This invention relates to transistor circuits and, more particularly, to gating transistor circuits of high reliability.

There are many applications in which the utilization of circuits having a relatively long error-free life is desirable, and there are some applications in which the utilization of such circuits in mandatory. For example, in space vehicles and satellites which travel over long periods of time, the communication and other electronic equipment should operate correctly for long periods of time. As another illustration, the usefulness of digital computers depends greatly upon the component and circuit reliability because inaccurate results may be provided due to a component or circuit failure.

Due to manufacturing tolerances and deterioration with time, the parameters of the various components in any circuit vary. In fact, even if used below the manufacturers ratings, a percentage of the components fail prematurely either shorting or becoming open-circuited. For these reasons, computers generally include checking facilities both for the computer components and for the computer circuitry. As to circuit reliability, the major problem is due to the non-uniformity and instability of component parameters. To improve the reliability of such circuits, entire circuits and portions of circuits are duplicated. For example, two complete computers may be operated in parallel. The smaller the portion of the circuit which is redundant or duplicated, the greater the improvement in reliability. Component redundancy is provided if each component is effectively duplicated so that if a component fails the circuit is still operable. Component redundancy provides for the greatest reliability because the components are the smallest finite portions of the circuit.

In a specific illustrative embodiment of this invention, a gate circuit arrangement and shift register arrangement are provided in which the redundancy is almost on a component basis. The arrangements are, accordingly, highly reliable and, in fact, the reliability of each arrangement is roughly equivalent to the reliability of a single resistor. More specifically, the redundant circuit may be approximately 70 times as reliable as the corresponding non-redundant circuit. The gate circuit, which is utilized in the shift register is of the "NOR" gate type providing an output only if the two input signals are both absent. The gate circuit includes four transistors having emitter-to-collector paths connected in a series parallel arrangement. Each of the transistors is separately controlled by the two inputs coupled through individual resistive circuits which are coupled to the base electrodes of the transistors. The resistive circuits are serially redundant to prevent overloading the circuits driving the gate circuit. Parallel redundancy of the resistive circuits or of the base biasing circuitry of each transistor is unnecessary because the transistors themselves are operated in parallel. The collector biasing resistor means, however, is in the form of a series parallel arrangement of four resistors. A variation in characteristics of any component, including the transistors, from a direct short to an open circuit does not affect the operation of the gate circuit.

Features of this invention relate to the provision of a circuit arrangement in which three terminal components such as junction transistors are utilized in a redundant connection so that a failure or change in characteristic of a transistor does not affect the operation of the circuit arrangement.

Two such gate circuit arrangements form a flip-flop utilized in each stage of the shift register arrangement of this invention. The stages are interconnected by shifting circuitry including capacitors which are arranged on a component redundancy basis with each effective component being in the form of a series parallel arrangement of four components. Both the shifting circuitry and the flip-flops are, accordingly, redundant on an effective component basis.

Further advantages and features of this invention will become apparent upon consideration of the following description when read in conjunction with the drawing wherein.

Figure 1:
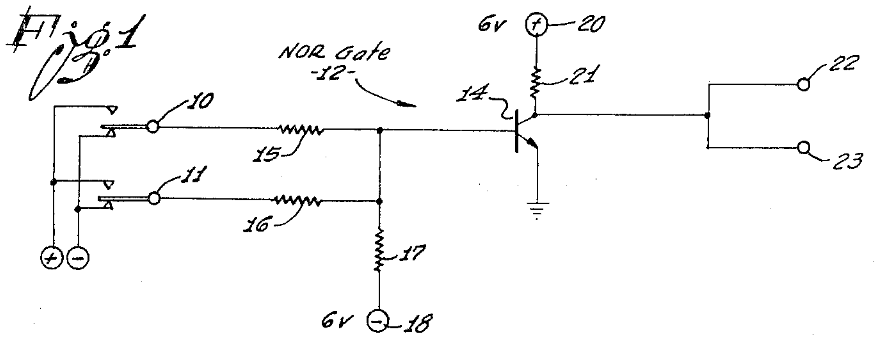
FIGURE 1 is a circuit representation of a conventional NOR gate circuit which is the basis for the redundancy NOR gate circuit of this invention.

Referring first to FIGURE 1, a conventional NOR gate circuit 12 is depicted having two input terminals 10 and 11 and two output terminals 22 and 23. The NOR gate circuit 12 has two output terminals 22 and 23 so that it has a fan out of two and can drive two similar such circuits. The circuit 12 is referred to as a NOR gate because an output signal is provided only if neither of the input signals is present. If both of the input signals are present, an output signal is not provided. The input signals are coupled respectively to the input terminals 10 and 11.

The terminal 10 is connected by a resistor 15 to the base electrode of an NPN junction type transistor 14. The terminal 11 is coupled through a resistor 16 to the base electrode of the transistor 14. The base electrode of the transistor 14 is biased by a negative potential source 18 which is coupled thereto by a base biasing resistor 17. The emitter electrode of the transistor 14 is grounded, and its collector electrode is biased by a positive potential source 20 coupled thereto by a collector resistor 21. The collector electrode of the transistor 14 is also connected to each of the output terminals 22 and 23.

The junction transistor 14 is non-conductive when a relatively negative input potential is at both of the input terminals 10 and 11. With a relative negative potential at both of the terminals 10 and 11, the base-to-emitter junction of the transistor 14 is reversed biased to inhibit current from the source 20 through the collector resistor 21 and the collector-to-emitter path of the transistor 14 to ground. When the potential at either of the input terminals 10 and 11, however, is positive, indicative of the absence of a negative input signal at these terminals, the base-to-emitter junction of the transistor 14 becomes forward biased so that the transistor 14 becomes conductive. With the transistor 14 conductive, the potential at the output terminals 22 and 23 becomes relatively negative due to the voltage drop across the collector resistor 21. The resistor 17 is chosen to insure that the base electrode of the transistor 14 remains negative if neither of the inputs is positive.

The NOR gate circuit 12 is fairly conventional and in itself forms no part of this invention. The reliability of the NOR gate circuit 12 is relatively poor in that the failure of any one of the components in the circuit may provide for faulty signals at the output terminals 22 and 23. For example, if the collector-to-emitter path through the transistor 14 short circuits for any reason, the output potential will be continuously relatively negative. Similarly, if the transistor becomes open circuited, the output potentials will be relatively positive. There are many applications where considerably greater reliability is desirable and sometimes mandatory, particularly where hundreds or thousands of such circuits are required to work in conjunction.

Figure 2:
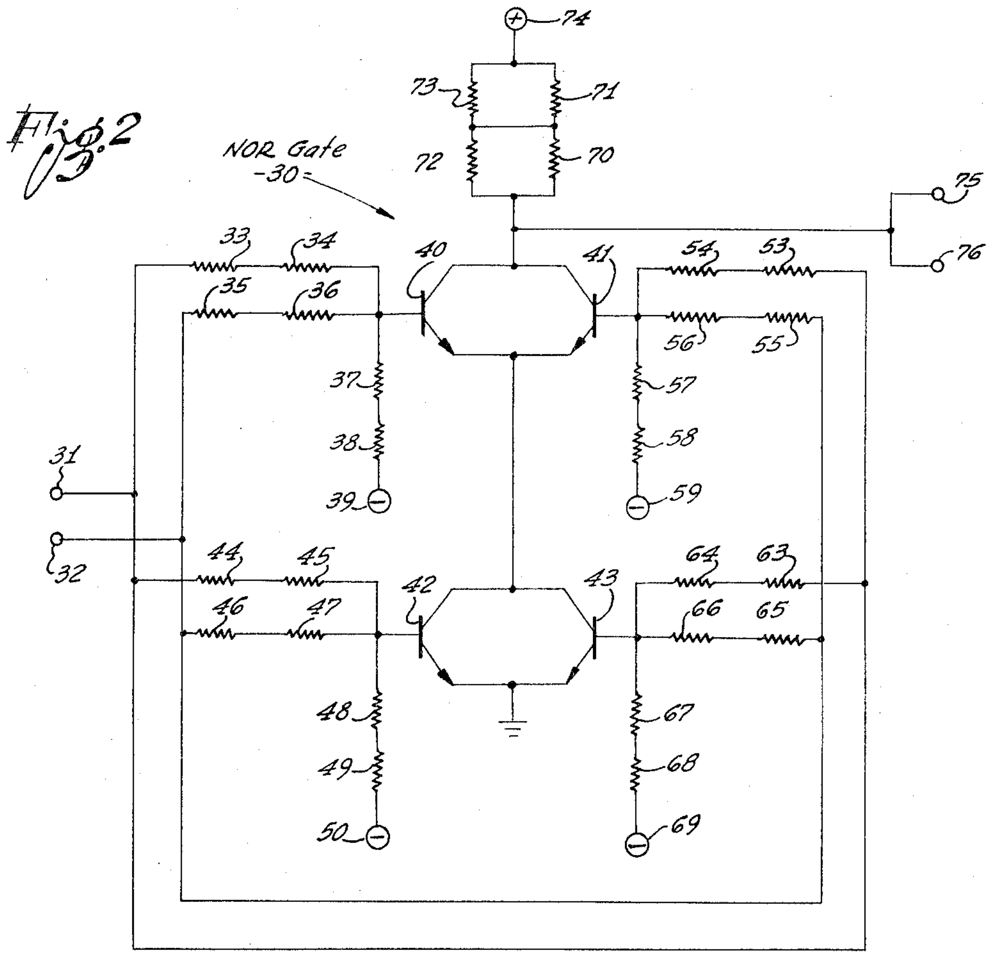
FIGURE 2 is a circuit representation of a NOR gate circuit of this invention which duplicates the function of the NOR gate circuit of FIGURE 1 in a highly reliable manner.

Referring now to FIGURE 2, the reliability of a NOR gate circuit 30, depicted therein, is considerably greater than that of the NOR gate circuit 12. As shown in FIGURE 2, the NOR gate circuit 30 has more components than the NOR gate circuit 12 and, in fact, includes more than four times as many components and yet the overall reliability of the circuit 30 in order of magnitude is greater than that of the circuit 12. The circuit reliability can be roughly similar to the reliability of a single resistor utilized in the circuit. More particularly, an improvement in reliability of approximately 70 to 1 is provided by the circuit 30 over that of the circuit 12. The mean time before failure is accordingly, approximately 70 times as long. The NOR gate circuit 30 performs the same function as does the NOR gate circuit 12 providing an output at its outpt t terminals 75 and 76 only when a negative input signa' is absent at the input terminals 31 and 32.

The input terminals 31 .ind 32 are each connected through different resistive circuits to the base electrodes of four transistors 40 through 43. The collector-to-emitter paths of the four transistors 40 through 43 are connected in a series parallel relationship. More particularly, the collector electrodes of the two transistors 40 and 41 are connected together, the emitter electrodes of the two transistors 40 and 41 are connected together, and to the collector electrodes of the two transistors 42 and 43. The emitter electrodes of the two transistors 42 and 43 are connected together and to a ground connection. The collector electrodes of the transistors 40 and 41 are connected by a series parallel arrangement of four resistors 70 through 73 to a positive potential source 74.

When the two negative input signals are not present at the terminals 31 and 32, all four transistors 40 through 43 are conductive to effectively provide a low impedance path between the output terminals 75 and 76 and the ground connection. If any one of the transistors 40 through 43 is open circuited, the transistor paralleling it completes the low impedance path from the output terminals 75 and 76 to the ground connection. If any one of the transistors 40 through 43 is short circuited, the two paralleled transistors serially connected therewith function to provide a high impedance between the output terminals 75 and 76 and the ground connection when both of the two negative input signals are present. The impedance presented by any one of the four transistors 40 through 43 may, in this manner, vary from a short circuit to an open circuit without affecting the operation of the circuit 30.

The input signals are provided to the base electrodes of the four transistors 40 through 43 in parallel with each parallel branch consisting of two serially connected resistors. The base electrode of the transistor 40 is connected by the resistors 34 and 33 to the input terminal 31 and by the serially connected resistors 36 and 35 to the input terminal 32. Similarly, the base electrode of the transistor 42 is connected by the resistors 45 and 44 to the input terminal 31, and by the serially connected resistors 47 and 46 to the input terminal 32. The resistors 53 through 56 interconnect the base electrode of the transistor 41 in a similar manner to the terminals 31 and 32, and the resistors 63 through 66 interconnect the base electrode of the transistor 43 in a similar manner to the terminals 31 and 32. If any one of the resistors 33 through 36, 44 through 47, 53 through 56 and 63 through 66 either becomes open circuited or short-circuited, or assumes any impedance therebetween, it does not affect the function of the NOR gate circuit 30. If one of these resistors short circuits, another resistor is serially connected therewith, and if one of the resistors open circuits, the associated transistor is maintained in a reverse-biased condition but, as described above, if any one of the transistors 40 through 43 becomes open circuited, it does not affect the operation of the NOR gate circuit 30.

In addition to the resistive connections from the base electrodes of the four transistors 40 through 43, the base electrodes of the four transistors 40 through 43 are coupled respectively to negative potential sources 39, 59, 50 and 69 by two serially connected resistors. The base electrode of the transistor 40 is biased over a path through the resistors 37 and 38; the base electrode of the transistor 41 over a path through the resistors 57 and 58; the base resistor of the transistor 42 over a path through the resistors 48 and 49; and the base electrode of the transistor 43 over a path through the resistors 67 and 68. As is further hereinafter described, the resistors 33 through 36, 44 through 47, 53 through 56 and 63 through 66 may all have similar values and the resistors 37, 38, 48, 49, 57, 58, 67 and 68 may all have similar values.

Series parallel connections are not utilized for the components coupled to the respective base electrodes because the transistors 40 through 43 are themselves connected in a series parallel arrangement so that a malfunction in any of their base circuits merely affects one of the transistors and, therefore, does not affect the overall operation of the gate circuit 30. The redundancy is, accordingly, not strictly on a component basis but the reliability of the circuit as shown in FIGURE 2 is close to that of a theoretical circuit having strict component redundancy. Component redundancy is complicated by the fact that the transistors 40 through 43 are three terminal instead of two terminal elements.

In order to provide for the NOR gate operation with any component failure, the change in circuit resistance due to the failure of any of the resistors must be within a predetermined operating range. The following are illustrative parameters for the four transistors 40 through 43 and the various resistors and potential sources in the gate circuit 30: transistors 40–43 may be transistors, either silicon or germanium, with their collector-to-emitter saturation voltages $(V_{CE})_{sat}$ between 0.15 volt and 0.3 volt for a collector current $(I_C)$ of 10 milliamperes. Beta (B) is equal to the ratio of unsaturated collector current to base current $$\frac{(I_C)}{(I_B)}$$

and the base current $I_B$ is less than one microampere for base voltages $(V_B)$ less than 0.3 volt. The leakage current $(I_{CO})$ is less than 1 microampere, and $V_B$, the base voltage is approximately equal to 0.75 volt at $V_C$, the collector voltage, equal to 0.3 volt and $I_C$ being between 3 and 10 milliamperes. The various resistors in the circuit may be molded deposited carbon or metal film resistors having tolerances less than 1 percent but derated to tolerances of 3 percent for further reliability. The supply voltages may be plus and minus 6 volts of 1 percent variation also derated to 3 percent. Assuming these tolerances and ranges, the resistance values may be calculated to provide for the operation of the circuit 30 with any component failure. With the worse possible tolerances including one of the collector resistors shorted, the calculated is as follows:

(1)
$$I_C \text{ maximum} = \frac{12.12}{R_2}$$

where $R_2$ is the resistance of one of the collector resistors 70–73. With the worse tolerance and one $R_2$ open in one NOR gate and one $R_1$ (resistors 33–36, 44–47, etc.) shorted, $$(2)\qquad I_B \text{ minimum}=\frac{0.547}{0.216R_1+1.545R_2}-\frac{6.18}{1.94R_3}$$

where $R_3$ is the resistance of one of the base biasing resistors 37, 38, 48, 49, 57, 58, 67 and 68. The base voltage must be less than 0.3 volt to reverse-bias the transistor. Assuming the worse tolerances, $$(3)\qquad 0.3=\frac{12.45R_1}{1.94R_1+2.06R_3}$$

the $$\text{minimum beta } (B)=\frac{I_C \text{ max.}}{I_B \text{ min.}}$$

and therefore may readily be calculated knowing $R_1$, $R_2$, and $R_3$. Solving Equations 1, 2 and 3 for $R_1$, $R_2$ and $R_3$ gives the following values:

$R_1$=2.89 kilohms
$R_2$=1.212 kilohms
$R_3$=55.5 kilohms
$B_{min}$—60

The output voltage for these values is 2.02 volts. The transistors 40–43 must, accordingly, be high gain transistors to compensate for the normal tolerances and component failures. If 12 volt sources are utilized, transistors having a minimum beta B of 40 may be utilized instead of a minimum beta of 60. If the fanout is reduced from two outputs to one, of course the transistor requirements are less stringent. The circuit reliability utilizing such circuit parameters is quite high and, as indicated above, is comparable to the reliability of a single resistor.

Figure 3:
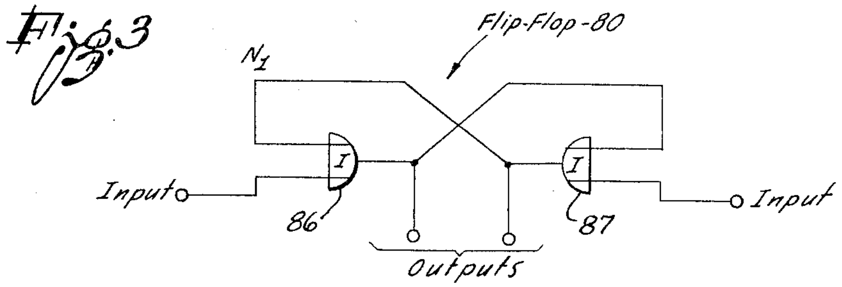
FIGURE 3 is a functional representation of a flip-flop circuit utilizing two NOR gate circuits of this invention.

The NOR gate circuits 30 may be interconnected to form a flip-flop circuit 80 which is depicted in FIGURE 3. One input of the flip-flop circuit 80 is provided to a NOR gate circuit 86, and the other input of the flip-flop circuit 80 is provided to a NOR gate circuit 87. The two gate circuits 86 and 87 are similar to the gate circuit 30 described above. When either one of the NOR gate circuits 86 and 87 is in its normal condition, it provides a relative negative signal to the other NOR gate circuit in the circuit 80. Assume, for example, that the NOR gate circuit 86 is in its normal condition with its four transistors 40 through 43 conductive and that the NOR gate circuit 87 is in its operated condition with its four transistors 40 through 43 non-conductive. Applying a positive input to the NOR gate circuit 87 causes its transistors 40 through 43 to become conductive and to apply a negative input to the NOR gate circuit 86. The NOR gate circuit 86, accordingly, is reset with its transistors 40 through 43 becoming non-conductive.

Figure 4:
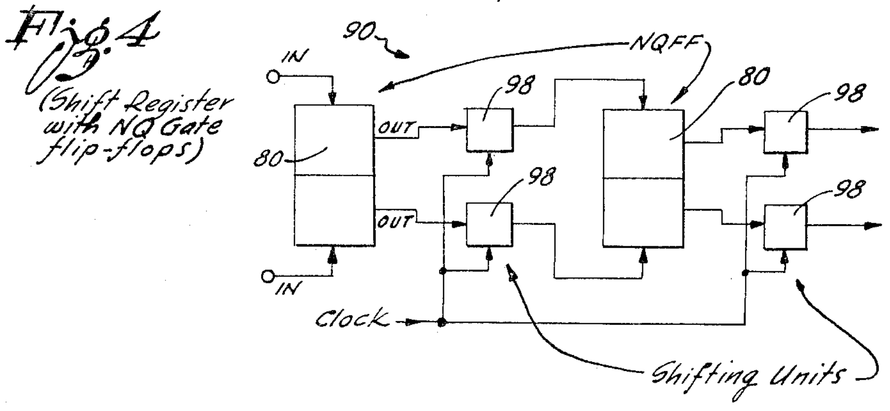
FIGURE 4 is a functional representation of a portion of a shift register utilizing a number of flip-flop circuits of FIGURE 3.

The flip-flop circuit 80 may be utilized as part of a shift register 90 shown functionally in FIGURE 4. The shift register 90 includes a number of flip-flop circuits 80 interconnected by pairs of shifting units 98. A clock pulse is provided simultaneously to the shifting unit 98 for transferring the information register in one flip-flop circuit 80 to the next adjacent flip-flop circuit 80. The details of the shifting units 98 are depicted in FIGURE 5.

Figure 5:
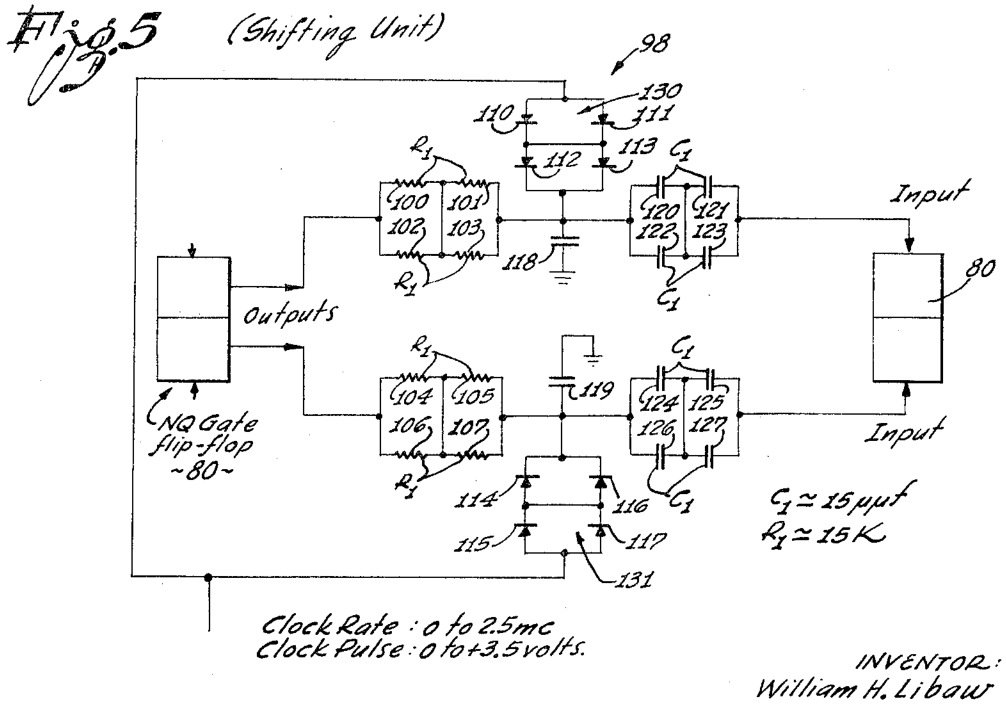
FIGURE 5 is a partially functional and partially circuit representation of a stage of the shift register of this invention illustrating the shifting circuitry.

Referring to FIGURE 5, the various components of the unit 98 are inter-connected in a series parallel arrangement similar to that described for some of the components in the NOR gate circuit 30. The redundancy is, accordingly, on a component basis so that a highly reliable circuit arrangement is provided. The shifting unit 98 includes two diode arrangements 130 and 131 which are controlled by the output potentials of the associated flip-flop circuit 80. One of the two diode arrangements 130 and 131 is conductive and the other is non-conductive in accordance with the condition of the associated flip-flop circuit 80. The arrangement 130 includes four diodes 110 through 113 connected in the series parallel redundancy arrangement so that a failure of any one does not affect the function of the arrangement 130. For example, if the diode 110 shorts or becomes open circuited, it does not affect the two impedance conditions of the arrangement 130 as controlled by the associated flip-flop circuit 80. The arrangement 131 is similar to the arrangement 130 having four diodes 114–117 connected in a series parallel arrangement. The clock pulses are provided to the diode arrangements 130 and 131. Assume, for example, that the flip-flop circuit 80 at the left in FIGURE 5 is set so that a positive potential is provided at its upper output terminal and a relatively negative potential at its lower output terminal. The lower output terminal is connected to four resistors 104 through 107 connected in the redundancy series parallel arrangement to the cathodes of the two diodes 114 and 116 of the diode arrangement 131. The diodes 114 through 117 are, accordingly, forward biased so that the clock pulse readily passes through the arrangement 131.

The upper output terminal or flip-flop circuit 80 is connected to four resistors 100 through 103 also connected in the series parallel redundancy arrangement. The resistors 101 and 103 are multipled to the cathodes of the diodes 112 and 113. With the positive potential at the upper output terminal of the circuit 80, the diodes 110 through 113 are in a reversed biased condition so that the clock pulse does not pass through the arrangement 130. The arrangement 130 is connected to four capacitors 120 through 123 which are also connected in the series parallel redundancy arrangement. The capacitors 120 through 123 function as a storage element for keeping track of the condition of the preceding flip-flop circuit 80 in the shift register chain. Similarly, four capacitors 124 through 127 in a series parallel arrangement are connected to the cathodes of the diodes 114 and 116 of the arrangement 131. The capacitors 120 through 123 provide for a capacitive coupling to one input of the next flip-flop circuit 80 and the capacitors 124 through 127 provide for a connection to the other input of the next flip-flop circuit 80.

With the diodes 114 through 117 of the arrangement 131 forward biased, the clock pulse is coupled to the capacitors 124 through 127. A grounded capacitor 119 also connected to the cathodes of the diodes 114 and 116 represents the wiring capacitance. A similar capacitor 118 is connected to the cathodes of the diodes 112 and 113. The wiring capacitance assists the memory function of the associated four capacitors. The clock pulse through the arrangement 131 is provided to the capacitor 119 and the four capacitors 124 through 127. The capacitors 124 through 127 may have a suitable value such as 15 micro-microfarads. The capacitors 120 through 123 may have a similar value. The resistors 100 through 107 each may have a value such as 15 kilohms. The pulse through the capacitors 124 through 127 functions to set the next circuit 80 in accordance with the condition of the preceding circuit 80. The capacitors 120 through 123 maintain the diodes 110 through 113 in a reverse bias condition when the condition of the preceding flip-flop circuit 80 is changed.

In this manner, the shifting unit 98 includes a pedestal type gate with time storage elements to keep track of the preceding storage condition. Each of the components utilized in the shifting unit 98 is connected in a series parallel redundancy arrangement so that the failure of any component does not affect the shifting operation of the unit. The shift register made up of the shifting unit 98 and the flip-flop circuit 80 is, accordingly, a highly reliable arrangement. The various components in the flip-flop circuits 90, while not arranged strictly on a component redundancy basis, are arranged in a manner to provide for a circuit reliability comparable to that achieved when each component is individually connected in a series parallel redundancy arrangement.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination, at least two input terminals for receiving input signals, four transistors each having a base, an emitter and a collector and having conductive and non-conductive states, a pair of resistive circuit arrangements for each of the transistors, one arrangement of each of the pairs of arrangements being connected from the base of the associated transistor to one of the two input terminals, the other arrangement of each of the pairs of arrangements being connected from the base of the associated transistor to the other one of the two input terminals, each of the arrangements including at least two serially connected resistors, biasing means coupled to the bases of each of said four transistors and including at least two serially connected resistors to bias the transistors in a particular one of the conductive and non-conductive states, means directly connecting the emitters of a first two of said transistors to each other and to the collectors of the other two of the four transistors, means directly interconnecting the emitters of the other two transistors, means directly interconnecting the collectors of the first two of the four transistors, biasing means connected to the collectors of the first two of said four transistors and including a series parallel arrangement of four resistors to facilitate the operation of the transistors in the conductive state, and at least one output terminal connected to the collectors of the first two of said four transistors.

2. A redundancy circuit, including, a first and a second gating arrangement, each of said first and said second gating arrangements including two input terminals for receiving input signals and including an output terminal, each of the gating arrangements including first and second groups of four transistors, each of the transistors in the first and second groups having a base, an emitter and a collector and having conductive and non-conductive states, a pair of resistive circuit arrangements for each of the transistors, the bases of the transistors in the first group being connected to the input terminals in the first group, the bases of the transistors in the second group being connected to the input terminals in the second group, biasing means coupled to the bases of each of said four transistors in each of the first and second groups and including at least two serially connected resistors to bias the transistors in a particular one of the conductive and non-conductive states, means directly connecting the emitters of a particular pair of said transistors in each of said first and second groups to the collectors of the other pair of the four transistors in that group, means directly interconnecting the emitters of the other pair of transistors in each of the first and second groups, means directly interconnecting the collectors of the particular pair of the four transistors in each of the first and second groups, biasing means connected to the collectors of the particular pair of said four transistors in each of the first and second groups and including a series parallel arrangement of four resistors to facilitate the production of the conductive state in the transistors, the output terminal of the first gating arrangement being connected to the collectors of the particular pair of transistors in the first group to produce an output voltage in accordance with the production of the conductive or non-conductive states in the transistor, the output terminal of the second gating arrangement being connected to the collectors of the particular pair of transistors in the second group to produce an output voltage in accordance with the production of the conductive or non-conductive states in the transistors, means connecting the output terminal of said first gating arrangement to one of the two input terminals of said second gating arrangement, and means connecting the output terminal of said second gating arrangement to one of the two input terminals of said first gating arrangement.

3. In combination, two input terminals for receiving input signals, four transistors each having a base, an emitter and a collector and each having conductive and non-conductive states, resistive circuit means connecting the base of each of said four transistors to both of said two input terminals, biasing means coupled to the bases of each of said four transistors to bias the transistors in a particular one of the conductive and non-conductive states, means directly connecting the emitters of a first two of said transistors to each other and to the collectors of the other two of the four transistors, means directly interconnecting the emitters of the other two transistors, means directly interconnecting the collectors of the first two of the four transistors, biasing means connected to the collectors of the first two of said four transistors to facilitate the production of conductive states in the transistors, and at least one output terminal connected to the collectors of the first two of said four transistors, said first mentioned biasing means consisting of a first potential source and two serially connected resistors between said first potential source and each of the bases, said second mentioned biasing means consisting of a second potential source and four resistors connected in a series parallel circuit arrangement between said second potential source and the collectors of the first two of said four transistors.

4. The gate circuit set forth in claim 3 in which the resistive circuit means connecting each input terminal to the base of each of the four transistors is in a series circuit arrangement of at least two resistors in each series circuit arrangement.

5. A redundancy shifting arrangement, including, a number of shift units, and a number of flip-flops connected in a chain each consisting of two interconnected redundancy NOR gate circuits, each of said gate circuits including two input terminals for receiving input signals, four amplifying elements each having three electrodes and having conductive and non-conductive states, circuit means connecting a first one of the three electrodes of each of said amplifying elements to both of said two input terminals, means connecting the other two of the three electrodes of a first one of the amplifying elements respectively to corresponding ones of the other two of the three electrodes of a second one of the amplifying elements to provide parallel paths through said first and said second ones of said amplifying elements, means connecting the other two of the three electrodes of a third one of the amplifying elements respectively to corresponding ones of the other two of the three electrodes of the fourth one of the amplifying elements to provide parallel paths through said third and said fourth ones of said amplifying elements, and circuit means directly connecting first ones of the other two electrodes in the first and second amplifying elements to second ones of the other two electrodes in the third and fourth amplifying elements to provide a series arrangement between the first and second amplifying elements in parallel and the third and fourth amplifying elements in parallel, each of said shifting units including two gates coupled to the preceding one of the flip-flops in the chain, and two capacitor means coupled to the succeeding one of the flip-flops in the chain, said two gates each including a series parallel redundancy arrangement of four diodes, and said two capacitor means each including a series parallel redundancy arrangement of four capacitors.

6. The combination set forth in claim 1 in which the four transistors are included in a first group and in which four additional transistors are included in a second group and in which the two input terminals are included in a first group and in which at least two additional input terminals are included in a second group and in which the four transistors in the second group are interconnected in a manner similar to the interconnection of the four transistors in the first group and in which the bases of the transistors in the second group are connected to the input terminals of the second group through resistive circuit arrangements corresponding to the resistive circuit arrangements connecting the bases of the transistors in the first group to the input terminals in the first group and in which the collectors of the first two of the transistors in the first group are connected to one of the input terminals in the second group and in which the collectors of a first two of the transistors in the second group are connected to one of the input terminals in the first group.

7. A redundancy circuit as set forth in claim 4 in which the two input terminals are included in a first group and in which the four transistors are included in a first group and in which two additional input terminals are included in a second group and in which four additional transistors are included in a second group and in which the four transistors in the second group are interconnected in a relationship corresponding to the interconnection of the four transistors in the first group and in which resistive circuit means connect the base of each of the four transistors in the first group to both of the input terminals in the second group and in which the output terminal connected to the collectors of the transistors in the first group is connected to one of the input terminals in the second group and in which a second output terminal is connected to collectors of a first two of the four transistors in the second group and to one of the input terminals in the first group.

References Cited by the Examiner

UNITED STATES PATENTS

| | | | |
|---|---|---|---|
| 2,803,703 | 8/1957 | Sherwin | 307—88.5 |
| 2,942,193 | 6/1960 | Tryon | 328—92 |
| 2,946,900 | 7/1960 | Steinman et al. | 307—88.5 |
| 2,956,182 | 10/1960 | Norman | 307—88.5 |
| 2,977,486 | 3/1961 | Dobbie | 307—88.5 |
| 2,985,773 | 5/1961 | Dobbie | 307—88.5 |
| 3,069,562 | 12/1962 | Steele | 307—88.5 |

OTHER REFERENCES

Electronic Engineering, vol. 22, No. 274, Dec. 1950, pp. 492–498, "The Physical Realization of an Electronic Digital Computor," Booth.

IBM Technical Disclosure Bulletin, vol. 2, No. 6, Apr. 1960, "Binary Trigger," McDonald.

Proc. I.R.E., Apr. 1956, vol. 44, No. 4, pp. 509–515, "Increasing Reliability by the Use of Redundant Circuits," Creveling.

ARTHUR GAUSS, *Primary Examiner.*

HERMAN KARL SAALBACH, R. LAKE, J. BUSCH, *Assistant Examiners.*